(12) United States Patent
Chen et al.

(10) Patent No.: US 10,003,654 B2
(45) Date of Patent: Jun. 19, 2018

(54) UNIVERSAL INTERNET OF THINGS (IOT) SMART TRANSLATOR

(71) Applicant: ESMART TECH, INC., San Diego, CA (US)

(72) Inventors: Li Chen, Beijing (CN); Ying Xiong, San Diego, CA (US)

(73) Assignee: eSMART TECH INC., San Diego, CA (US)

( * ) Notice: Subject to any disclaimer, the term of this patent is extended or adjusted under 35 U.S.C. 154(b) by 0 days. days.

(21) Appl. No.: 15/655,717

(22) Filed: Jul. 20, 2017

(65) Prior Publication Data

US 2018/0115612 A1    Apr. 26, 2018

Related U.S. Application Data

(63) Continuation of application No. 15/298,379, filed on Oct. 20, 2016.
(Continued)

(51) Int. Cl.
*H04L 29/06* (2006.01)
*H04L 29/08* (2006.01)

(52) U.S. Cl.
CPC .......... *H04L 67/125* (2013.01); *H04L 67/16* (2013.01); *H04L 69/08* (2013.01); *H04L 69/18* (2013.01)

(58) Field of Classification Search
CPC .... H04W 4/001; H04W 12/06; H04L 67/303; H04L 63/08; H04L 41/12; H04L 12/66; H04L 67/125; H04L 67/16; H04L 69/18; H04L 69/08; G06N 3/006; G06F 9/54; G06F 9/466; G06F 17/30569; G06F 15/173; G05B 19/0421; B60R 16/0213
See application file for complete search history.

(56) References Cited

U.S. PATENT DOCUMENTS 9,052,216 B2    6/2015    Kamel et al.
9,210,534 B1    12/2015    Matthieu et al.
(Continued)

FOREIGN PATENT DOCUMENTS

WO    WO2013123445 A1    8/2013
WO    WO2014131029 A2    8/2014
(Continued)

*Primary Examiner* — Le H Luu
(74) *Attorney, Agent, or Firm* — Thomas D Foster; Bruce Hare (57) ABSTRACT

A system provides communication among user devices and Internet of things (IoT) devices includes a user device able to execute at least one application that is able to communicate using at least a first IoT protocol; an IoT device able to communicate using at least a second IoT protocol; and a universal translator able to communicate using at least the first IoT protocol and the second IoT protocol. An automated method of providing communications between a user device and an IoT device includes: determining a protocol of the IoT device; determining a protocol of the user device; and inserting a virtual device if the protocols are different. An automated method of translating communications for IoT systems includes: receiving a device protocol and identifier; receiving an application protocol and identifier; adding the application identifier to an application list; and adding the device identifier to a device list.

14 Claims, 8 Drawing Sheets

Related U.S. Application Data (60) Provisional application No. 62/311,729, filed on Mar. 22, 2016.

(56) References Cited

U.S. PATENT DOCUMENTS

| | | | | |
|---|---|---|---|---|
| 2001/0052031 | A1* | 12/2001 | Kinkade | G06F 9/54 |
| | | | | 719/314 |
| 2005/0267655 | A1* | 12/2005 | Gessner | B60R 16/0231 |
| | | | | 701/29.1 |
| 2008/0013569 | A1* | 1/2008 | Boren | H04L 12/66 |
| | | | | 370/466 |
| 2009/0100165 | A1* | 4/2009 | Wesley, Sr. | G06F 15/173 |
| | | | | 709/223 |
| 2015/0195365 | A1 | 7/2015 | Choi et al. | |
| 2016/0016096 | A1* | 1/2016 | Fisher | G05B 19/0421 |
| | | | | 700/90 |
| 2017/0024378 | A1* | 1/2017 | Sharma | G06N 3/006 |
| 2017/0060622 | A1* | 3/2017 | Haughwout | G06F 9/466 |
| 2017/0060911 | A1* | 3/2017 | Loscalzo | G06F 17/30569 |
| 2017/0064550 | A1* | 3/2017 | Sundaresan | H04W 12/06 |
| 2017/0126834 | A1* | 5/2017 | Fransen | H04L 67/303 |
| 2017/0208053 | A1* | 7/2017 | Sanghamitra | H04L 63/08 |
| 2017/0215023 | A1* | 7/2017 | Ly | H04W 4/001 |
| 2017/0237623 | A1* | 8/2017 | Hopkins | H04L 41/12 |
| | | | | 709/223 |

FOREIGN PATENT DOCUMENTS

| | | |
|---|---|---|
| WO | WO2014182692 A1 | 11/2014 |
| WO | WO2015/183014 A1 | 12/2015 |

\* cited by examiner

UNIVERSAL INTERNET OF THINGS (IOT) SMART TRANSLATOR

CROSS-REFERENCE TO RELATED APPLICATIONS

This application claims priority to U.S. Non-Provisional patent application Ser. No. 15/298,379, filed on Oct. 20, 2016 which claims priority to U.S. Provisional Patent Application Ser. No. 62/311,729, filed on Mar. 22, 2016.

BACKGROUND

Many Internet of things (IoT) devices such as light bulbs, toasters, televisions, etc. may utilize some IoT protocol and are able to be controlled by or otherwise interact with various applications (or "apps") that run on various user devices (e.g., smartphones, tablets, personal computers, etc.).

Such IoT devices utilize a variety of communication protocols. Likewise, the apps may utilize a variety of protocols. End users are forced to use apps that support the communication protocol of the IoT devices. In addition, IoT devices may not be able to interact with each other due to differing protocols.

Existing solutions such as bridges force users to utilize a single destination protocol, thus limiting the choice of devices.

Thus there exists a need for a universal IoT translator that is able to support multiple device protocols and multiple application protocols.

SUMMARY

Some embodiments provide a universal Internet of things (IoT) translator. Such a translator may allow communication among user devices (and/or associated applications) and IoT devices (and/or associated applications) when the user device protocols do not match the IoT device protocols.

The universal translator may include a core, a set of services, and a set of virtuals. Each service and each virtual may be associated with a different protocol. The core may communicate among the services and virtuals using an internal protocol.

Some embodiments of the universal translator may listen for devices and/or applications. If a broadcast message or beacon is received from a device or application, the universal translator may identify the protocol associated with the device or application. Some embodiments may maintain tables of applications and devices that specify the protocol used and a unique identifier for each application or device.

The universal translator may be able to relay messages, commands, data, etc., between user devices and IoT devices. Messages may be received from a user device at a virtual and converted from the protocol of the virtual to an internal protocol of the universal translator. The messages may be relayed to the service associated with an IoT device. The service may send the message to the IoT device.

Messages, data, etc. may be received from the IoT device at the associated services and converted to the internal protocol. The converted message may be relayed to the virtual device associated with the user device protocol and sent by the virtual device to the user device.

The preceding Summary is intended to serve as a brief introduction to various features of some exemplary embodiments. Other embodiments may be implemented in other specific forms without departing from the scope of the disclosure.

BRIEF DESCRIPTION OF THE SEVERAL VIEWS OF THE DRAWINGS

The exemplary features of the disclosure are set forth in the appended claims. However, for purpose of explanation, several embodiments are illustrated in the following drawings.

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide ways to implement communication among various internet of Things (IoT) devices.

A first exemplary embodiment provides a system that provides communication among user devices and IoT devices. The system includes: at least one user device able to execute at least one application that is able to communicate using at least a first IoT protocol; at least one IoT device able to communicate using at least a second IoT protocol; and a universal translator able to communicate using at least the first IoT protocol and the second IoT protocol.

A second exemplary embodiment provides an automated method of providing communications between a user device and an Internet of things (IoT) device. The automated method includes: determining a protocol of the IoT device; determining a protocol of the user device; and inserting a virtual device between the IoT device and the user device if the protocol of the IoT device is different than the protocol of the user device.

A third exemplary embodiment provides an automated method of translating communications for Internet of things (IoT) systems. The automated method includes: receiving a device protocol and identifier; receiving an application protocol and identifier; adding the application identifier to an application list; and adding the device identifier to a device list.

Several more detailed embodiments are described in the sections below. Section I provides a description of an exemplary hardware architecture. Section II then describes various exemplary methods of operation. Lastly, Section III describes a computer system which implements some of the embodiments.

I. System Architecture

Figure 1:
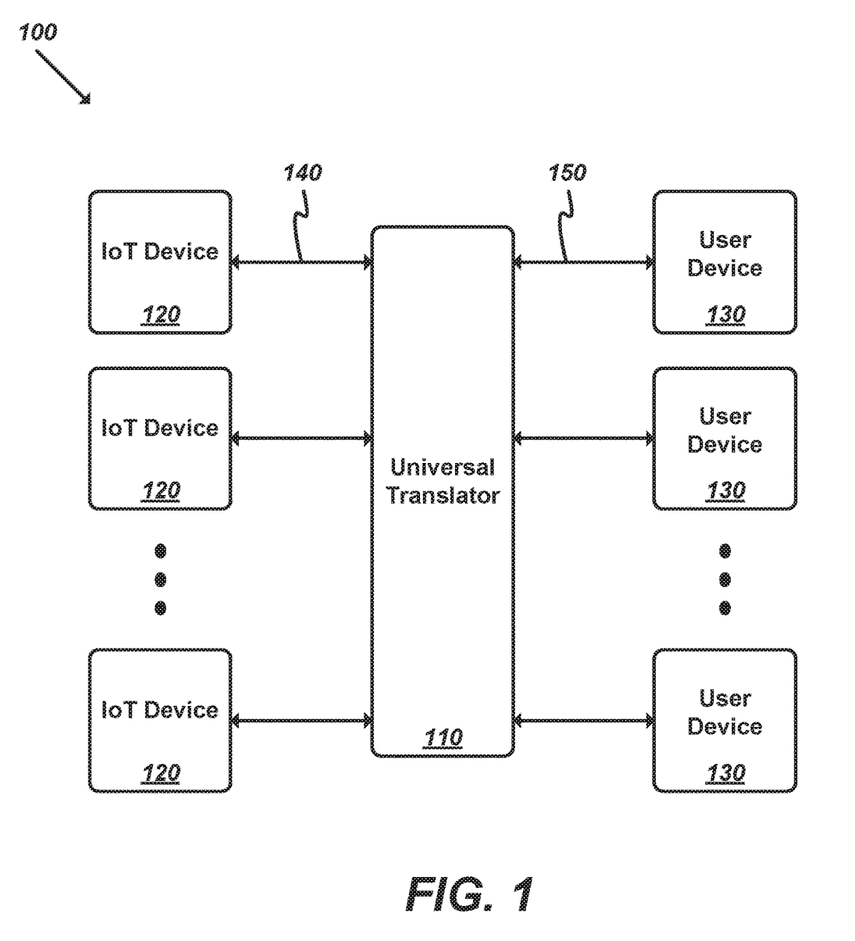
FIG. 1 illustrates a schematic block diagram of an exemplary hardware system according to an exemplary embodiment.

FIG. 1 illustrates a schematic block diagram of an exemplary hardware system 100 according to an exemplary embodiment. As shown, the system may include a universal translator 110, various IoT devices 120, and various user devices 130. The various components may communicate using IoT protocols 140-150.

The universal translator 110 may be an electronic device that is able to communicate among the IoT devices 120 and user devices 130 across multiple protocols 140-150, as necessary. The universal translator 110 may be implemented using one or more server devices that are accessible across various appropriate networks (e.g., cellular networks, wireless networks, the Internet, etc.). The translator may be included at a user device 130, IoT device 120, and/or a combination of user devices 130, IoT devices 120 and/or servers.

The universal translator 110 may be provided as a fully extensible plug-in to any IoT protocol (whether standard or proprietary). The translator may receive and apply updates automatically and securely. The translator may support existing and/or potential protocols such as wireless protocols. The translator may utilize encrypted communication. The universal translator will be described in more detail in reference to FIGS. 2-5 below.

Each IoT device 120 may be an electronic device that is capable of communicating across at least one protocol 140. The IoT devices 120 may include physical devices, vehicles, buildings, etc. with embedded IoT functionality. Example IoT devices include locksets, power or lighting, appliances, HVAC or heating systems, etc. In some cases the IoT devices may include multiple physical components (e.g., a smart light bulb may include a physical bulb and a computer system that resides in the cloud) that are able to communicate across one or more networks.

Such devices may include elements such as sensors, actuators, wired or wireless communication transmitters and/or receivers, etc. Such devices may typically be able to connect to one or more local or distributed networks.

Each user device 130 may be device such as a smartphone, tablet, personal computer, remote control, etc. That is able to communicate across at least one protocol 150, typically by executing an application. In addition, each user device may include components such as user interface elements (e.g., touchscreens, keypads, buttons, etc.) that may be used to control or otherwise interact with the various IoT devices 140.

In some embodiments, an IoT device 120 may server as the user device 130. For instance, an IoT garage door opener may be used to control an IoT light bulb.

During operation, a user device 130 may attempt to interact with an IoT device 120 (e.g., by sending a command to the IoT device). If the user device 130 is able to communicate using protocol 150 while the IoT device is able to communicate using protocol 140, the universal translator 110 may receive the command from the user device 130 across protocol 150 and deliver the command to the IoT device 120 across protocol 140.

The universal translator 110 may likewise allow the IoT device 120 to send messages or data by receiving communications from the IoT device over protocol 140 and delivering the communications to the user device 130 across protocol 150.

Figure 2:
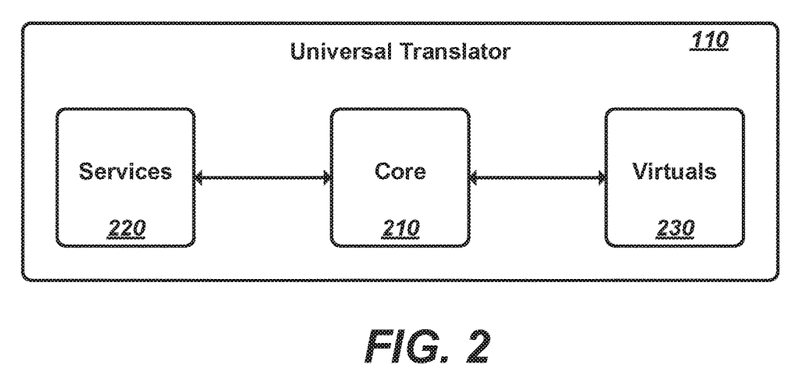
FIG. 2 illustrates a schematic block diagram of an exemplary universal translator provided by the system of FIG. 1.

FIG. 2 illustrates a schematic block diagram of an exemplary universal translator 110 provided by system 100. As shown, the universal translator may include a core 210, a set of services 220, and a set of virtual devices 230. One of ordinary skill in the art will recognize that the various components 210-230 of translator 110 may be implemented using multiple physical devices or computer systems.

The core 210 may process communications among the services 220 and the virtual devices 230 using an internal protocol. The core 210 may perform, direct, and/or otherwise carry out various other operations such as data lookup, storage, and/or evaluation, management of other components, etc. The core will be described in more detail in reference to FIG. 3 below.

The services 220 may include multiple plug-in modules that are able to communicate with various IoT devices 120 and or applications (e.g., via user devices 130) using any supported protocol. Such services 220 will be described in more detail in reference to FIG. 4 below.

The virtual devices 230 may include multiple plug-in modules that are able to instantiate as an IoT device in order to communicate with various user devices 130 using any supported protocol. Such virtual devices 230 will be described in more detail in reference to FIG. 5 below.

Figure 3:
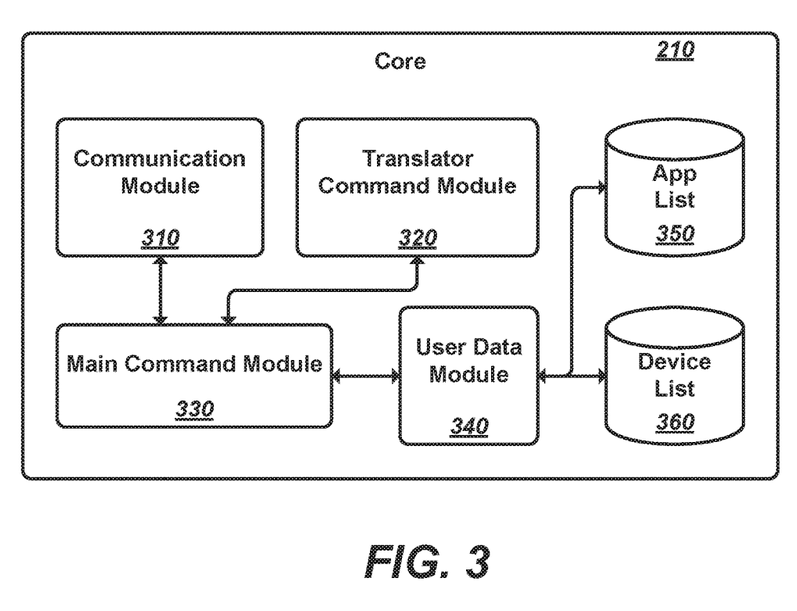
FIG. 3 illustrates a schematic block diagram of an exemplary core provided by the universal translator of FIG. 2.

FIG. 3 illustrates a schematic block diagram of an exemplary core 210 provided by the universal translator 110. As shown, the core 210 may include a communication module 310, a translator command module 320, a main command module 330, a user data module 340, an app list 350, and a device list 360.

The communication module 310 may manage, perform, or otherwise carry out communication (e.g., messaging, threads, etc.) between the services subsystem 220 and the virtual devices subsystem 230. The communication module 310 may further manage various hardware sub systems.

The translator command module 320 may manage command and/or protocol parsing.

The main command module 330 may manage a main thread overseeing all other modules with the core subsystem 210.

The user data module 340 may handle user and/or configuration data and maintain the app list 350 and device list 360.

The app list 350 may include a list of associated applications, their status, and/or other relevant information. The applications may be associated based on various relevant criteria such as installation on a user device, previous execution of the applications, a listing of available applications from a provider, etc.

The device list 360 may include a list of associated IoT devices, their status, and/or other relevant information. The devices may be associated based on various relevant factors such as previous interactions, association with a manufacturer, etc.

One of ordinary skill in the art will recognize that system and/or devices of FIGS. 1-3 may be implemented in various different ways without departing from the scope of the disclosure. For instance, some embodiments may include additional modules, devices, etc. As another examples, various modules may be eliminated. In addition, the various modules, devices, etc. may be implemented using various different communication pathways or schemes than shown.

Figure 4:
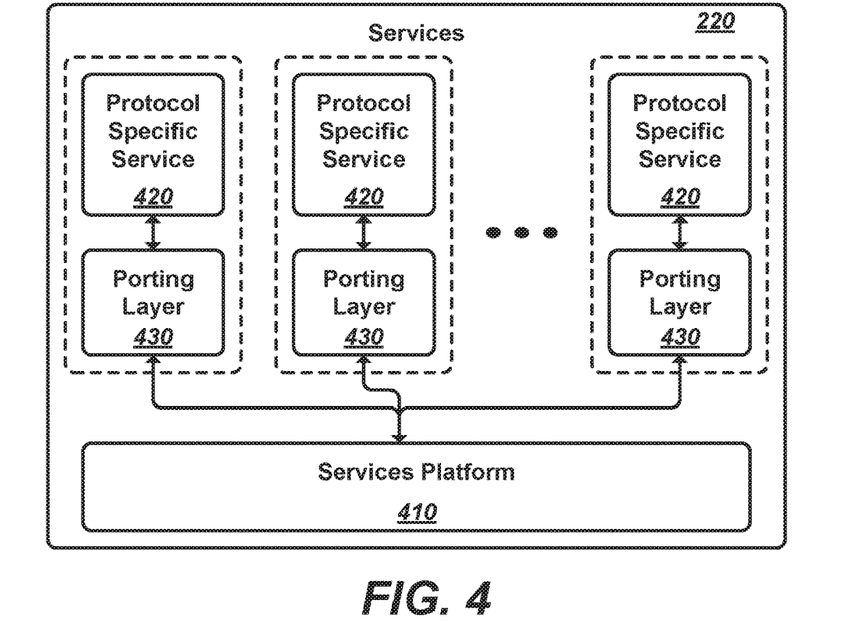
FIG. 4 illustrates a schematic block diagram of exemplary services provided by the universal translator of FIG. 2.

FIG. 4 illustrates a schematic block diagram of exemplary services 220 provided by the universal translator 110. As shown, the services 220 include a platform 410, and multiple sets of protocol specific services 420 and associated porting layers 430.

The platform 410 may be provided by the internal protocol of the translator 110 and may allow interaction with the core 210. The internal protocol may be a complete IoT protocol that is able to be used by an IoT device.

Each protocol specific service 420 may be associated with one or more corresponding IoT protocols and may include communication rules, parameters, attributes, etc. associated with the IoT protocol. In some cases, one or more protocol specific services 420 may be associated with a single IoT device 120 or user device 130 app, type or brand of device or app, multiple devices or apps associated with a specific protocol, etc.

Each porting layer 430 may link the associated specific service 420 to the internal protocol via the platform 410.

Figure 5:
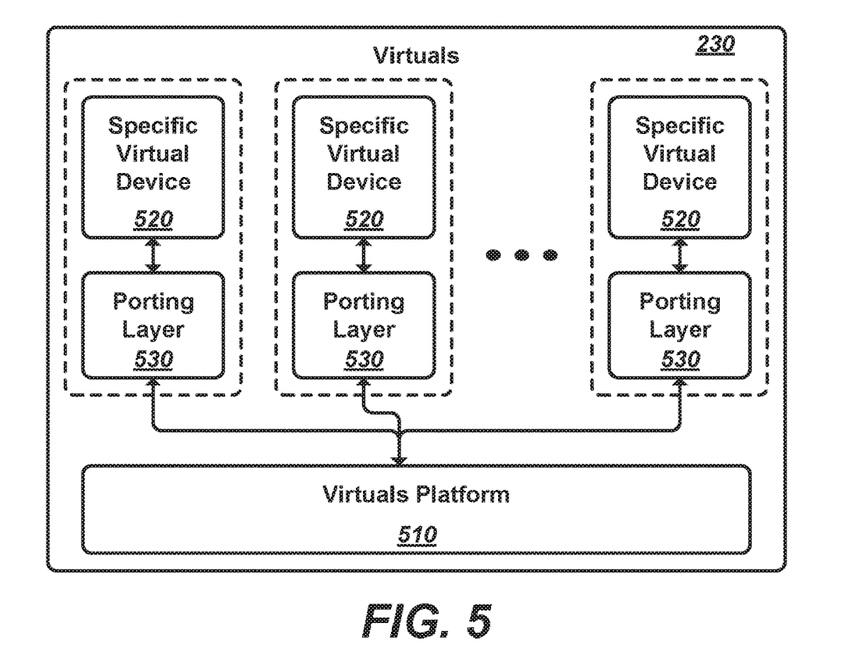
FIG. 5 illustrates a schematic block diagram of exemplary virtual devices provided by the universal translator of FIG. 2.

FIG. 5 illustrates a schematic block diagram of exemplary virtual devices provided by the universal translator 110. As shown, the virtuals 230 include a platform 510, and multiple sets of specific virtual devices 520 and associated porting layers 530.

The platform 510 may be provided by the internal protocol of the translator 110 and may allow interaction with the core 210.

Each virtual device 520 may be associated with one or more corresponding protocols and may include communication rules, parameters, attributes, etc. associated with an IoT device or user device protocol, where the protocol may be associated with an application running on the user device. In some cases, one or more protocol specific virtuals 520 may be associated with a single IoT device 120 or user device 130, type or brand of device(s), multiple devices associated with a specific protocol, etc.

Each porting layer 530 may link the associated specific virtual 520 to the internal protocol via the platform 510.

One of ordinary skill in the art will recognize that the system and components described above in reference to FIGS. 1-5 may be implemented in various different ways without departing from the scope of the disclosure. For instance, some embodiments may include additional modules or components (e.g., hardware modules, user interface elements, etc.), may omit various components, include different arrangements of components, etc.

II. Methods of Operation

Figure 6:
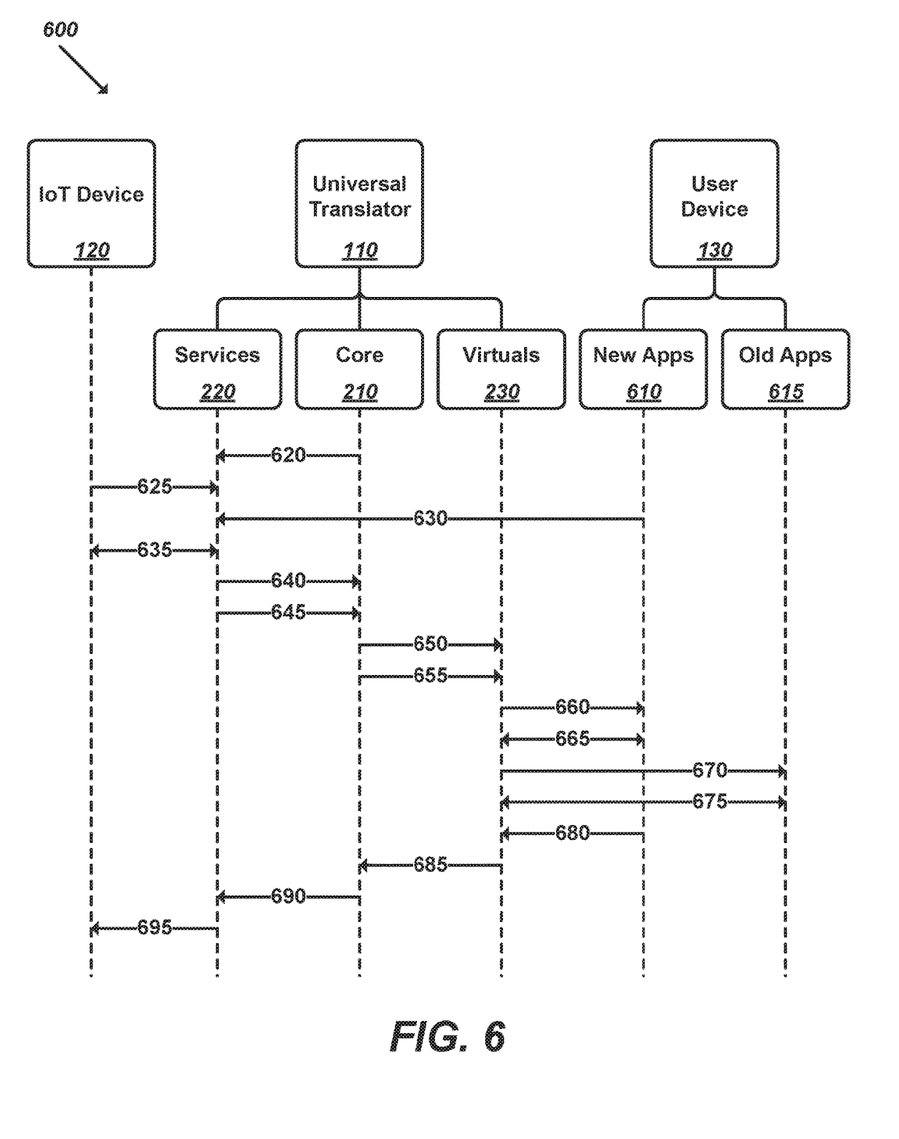
FIG. 6 illustrates a message flow diagram of an exemplary communication structure used by the system of FIG. 1.

FIG. 6 illustrates a message flow diagram of an exemplary communication structure 600 used by system 100. As shown, the system may include a universal translator 110, IoT device 120, and user device 130. The universal translator 110 in this example includes a core 210, services 220, and virtuals 230. The user device 130 may include new applications 610 and old or previously added applications 615.

As shown, the core 210 may send to the services 220 a request 620 to initiate service for each supported IoT protocol. The services 220 may respond to such a request by listening for devices and/or apps on each supported protocol.

Next, the IoT device 120 may broadcast an existence message or beacon 625 that is able to be received by one of the services 220. The service may, in turn, process the discovery of the new device 120 based on the protocol of the message 625.

A new app 610 may then broadcast an existence message or beacon 630 that is able to be received by one of the services 220. The service may, in turn, process the discovery of the new app 610 based on the protocol of the message 630.

The service 220 may establish a communication channel 635 between the service 220 and the device 120. Next, the service 220 may send a device notification 640 to the core 210. The notification 640 may include an indication of a new device, identified protocol associated with the device, a unique identifier or ID associated with the device, etc.

The service 220 may then send an app notification 645 to the core 210. The notification 645 may include an indication of a new app, identified protocol associated with the app, a unique identifier or ID associated with the app, etc.

In response to the notifications 640-645, the core 210 may then insert the new app information into the app list and insert the new device information into the device list. For each new devices, the core 210 may loop through the app list and if the protocols do not match, the core may initiate a virtual device instance corresponding to the app protocol. Such initiation may achieved by sending an instantiation request 650 for a new app and/or an instantiation request 655 for an existing app from the core 210 to the virtuals 230.

The core 210 may determine whether the protocol of the old app 615 matches the protocol of the new IoT device 120 and, if the protocols do not match, create a virtual 230 of the IoT device 120 that uses the protocol of the old app 615. Next, the new virtual 230 may broadcast an existence message 660 to the new app 610 and establish a communication channel 665 between the virtual 230 and the new app 610. Similarly, a virtual 230 associated with an existing app 615 may broadcast an existence message 670 to the old app 615 and establish a communication channel 675 between the virtual 230 and the old app 615. Alternatively, if the protocols do match, the core 210 may communicate directly with the new app 610 rather than via virtual 230.

The established communication channels (and internal channels of the universal translator 110) may then be utilized to allow two-way communication among the device 120 and apps 610 or 615. One example scenario is described below in reference to messages 680-695.

In this example, an operation (e.g., a turn-on command) may be initiated by a new app 610. As shown, the command 680 may be sent from the new app 610 to the virtual 230. The virtual may normalize the operation, command, or application programming interface (API) to the universal translator internal protocol.

Next, the normalized message 685 may be sent from the virtual 230 to the core 210 using the internal protocol. In response to the message 685, the core may identify the IoT device associated with the message using the device list. The normalized operation 690 may then be sent from the core 210 to the specific service 220 identified using the device list. Finally, the service may send the operation 695 to the IoT device 120 using the appropriate protocol for the IoT device.

A similar communication algorithm may be used to relay messages or data from the IoT device 120 to the user device 130.

One of ordinary skill in the art will recognize that the communication structure 600 may be implemented in various different ways without departing from the scope of the disclosure. For instance, although some messages may be represented as single entities, the various communications may include various numbers of packets of data, initialization messages, handshake or other communication protocols, etc. In addition, although the messages have been shown in a particular order, different embodiments may allow different structures and/or messaging sequences depending on the content of one or more messages and/or other relevant factors. Furthermore, the communication structure may be implemented using different specific physical components.

Figure 7:
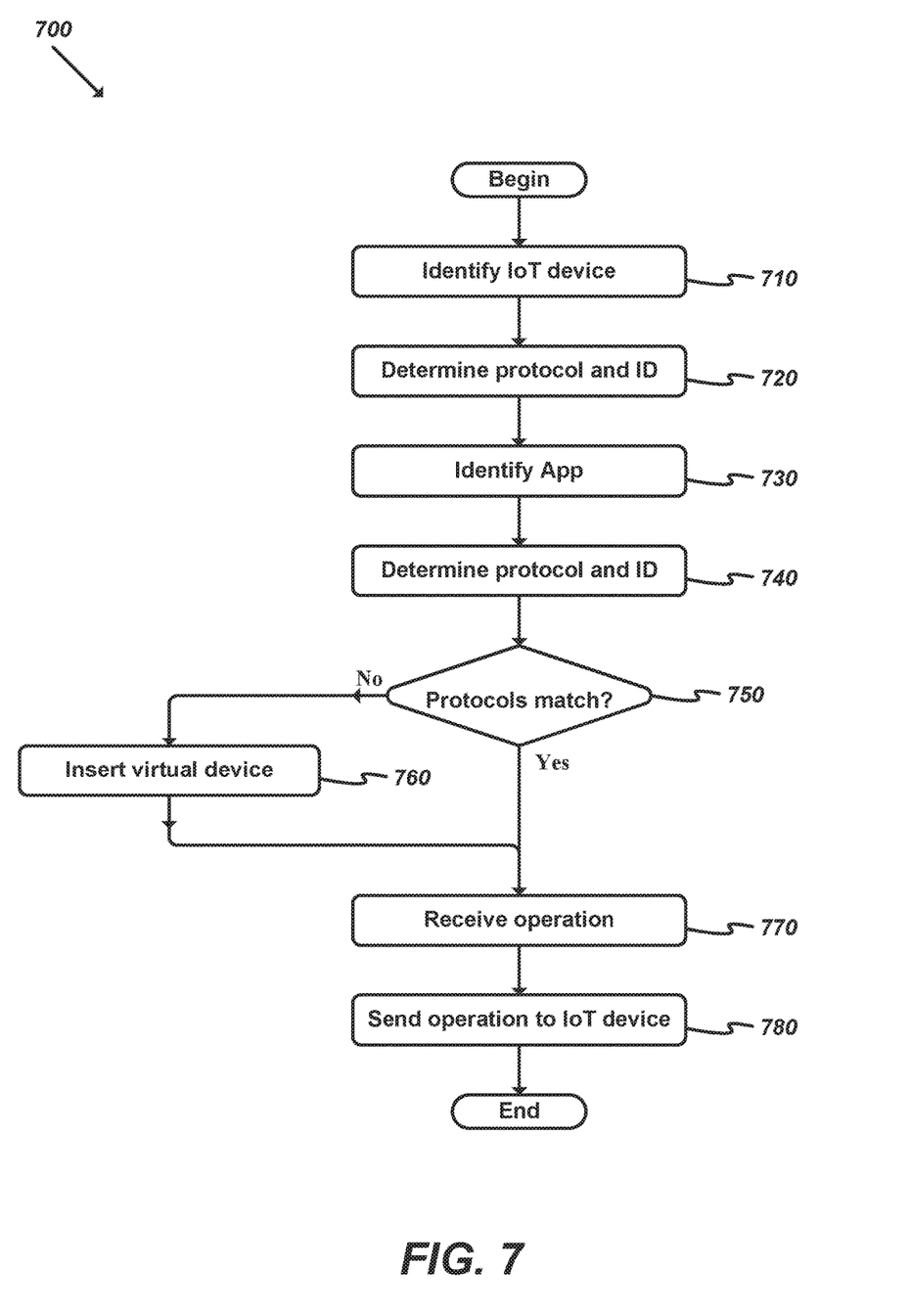
FIG. 7 illustrates a flow chart of an exemplary process that provides universal translation.

FIG. 7 illustrates a flow chart 700 of an exemplary process that provides universal translation. Such a process may begin, for instance, when a user device application is launched, when an IoT device is turned on, etc. The process may be performed by a component such as translator 110.

As shown, the process may identify (at 710) an IoT device. Next, the process may determine (at 720) a protocol and unique identifier (ID) for the IoT device. The protocol determination may be made based on various relevant factors (e.g., messages received from the device). The unique identifier may have been previously generated at the translator 110 and may be associated with a device list such as list 360.

The process may then identify (at 730) an application. The application may be executed by a user device such as a smartphone, tablet, personal computer, wearable device, etc. Next, the process may determine (at 740) a protocol and unique ID associated with the user device and or application. The protocol determination may be made based on various appropriate criteria (e.g., messages received from the app or device). The unique ID may have been previously generated at the translator 110 and may be associated with an app list such as list 350.

The unique IDs may be at least partly based on information associated with the user device (e.g., a serial number, model number, etc.) and may include automatically incremented elements, randomly generated strings, user input data, protocol specific ID, and/or other appropriate features that may allow for additional unique IDs to be generated for the new apps and devices as they are encountered. The translator 110 may then be able to identify the unique ID based on future communications received from the application(s) or device(s). The unique ID may be unique within the universal IoT system of some embodiments (i.e., it is insufficient for the ID to be unique within its own protocol).

Process 700 may then determine (at 750) whether the protocols and/or IDs match between the IoT device and the user device. In addition, some embodiments may determine whether the protocols match between a new app or new device and each existing app or device. If the protocols and IDs do not match, the process may insert (at 760) a virtual device that is able to translate communications between user devices and IoT devices.

Next, the process may receive (at 770) an operation such as a command from the application. The process may then send (at 780) the operation to the IoT device, where the operation may be sent via the virtual device, as appropriate.

A similar process may be used to receive communications at the user device from the IoT device or to allow communications among IoT devices.

Figure 8:
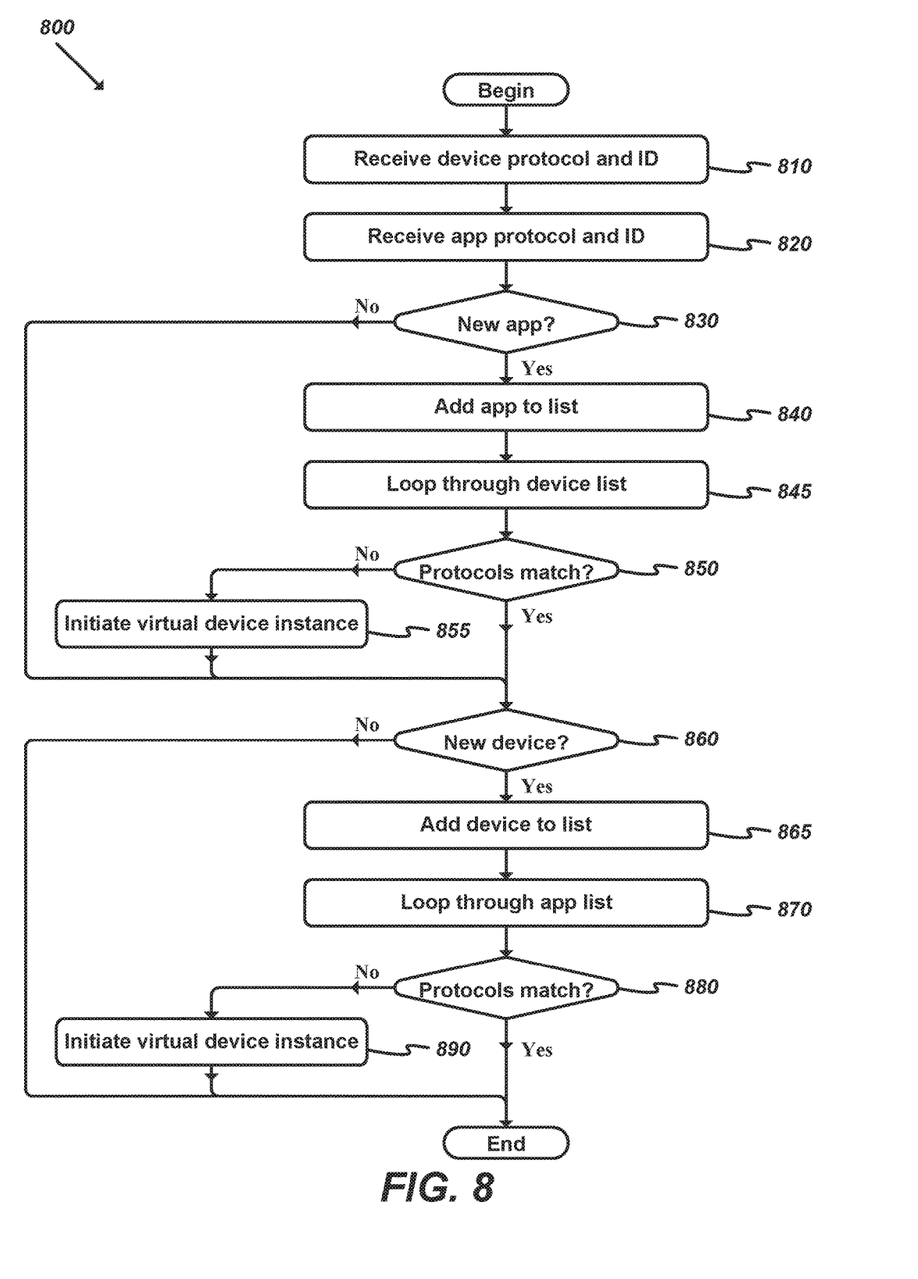
FIG. 8 illustrates a flow chart of an exemplary process that provides universal translation for an IoT device associated with multiple applications.

FIG. 8 illustrates a flow chart of an exemplary process 800 that provides universal translation for an IoT device associated with multiple applications. Specifically, process 800 describes the handling of new apps and devices. Such a process may begin, for instance, when a user device application is launched, when an IoT device is turned on, etc. The process may be performed by a component such as translator 110.

As shown, the process may receive (at 810) a device protocol and ID and receive (at 820) an app protocol and ID. Such information may be received from the services 220 at the core 210 using messages such as messages 640-645 described above.

Next, the process may determine (at 830) whether the app is a new app (i.e., an application that has not be encountered previously). Such a determination may be made by comparing the received app information to information in the app list. If the process determines that the app is new, the process add (at 840) the app to the app list.

Process 800 may then loop (at 845) through a list of existing IoT devices and determine (at 850) for each device in the device list, whether the protocols of the new app and the existing devices match. If the protocols do not match, the process may initiate (at 855) a virtual device instance.

After determining (at 830) that the app is not new, or after determining (at 850) that the protocols match, or after initiating (at 855) a virtual device instance, the process may determine (at 860) whether the device is a new device. Such a determination may be made by comparing the received device information to information in the device list. If the device is not a new device, the process may end.

If the process determines that the device is a new device the process may then add (at 865) the device to the device list. Process 800 may then loop (at 870) through the app list and determine (at 880) for each app in the app list, whether the protocols of the new device and the app match. If the protocols do not match, the process may initiate (at 890) a virtual device instance and then may end. If the protocols match, the process may end without instantiating any virtual device.

Figure 9:
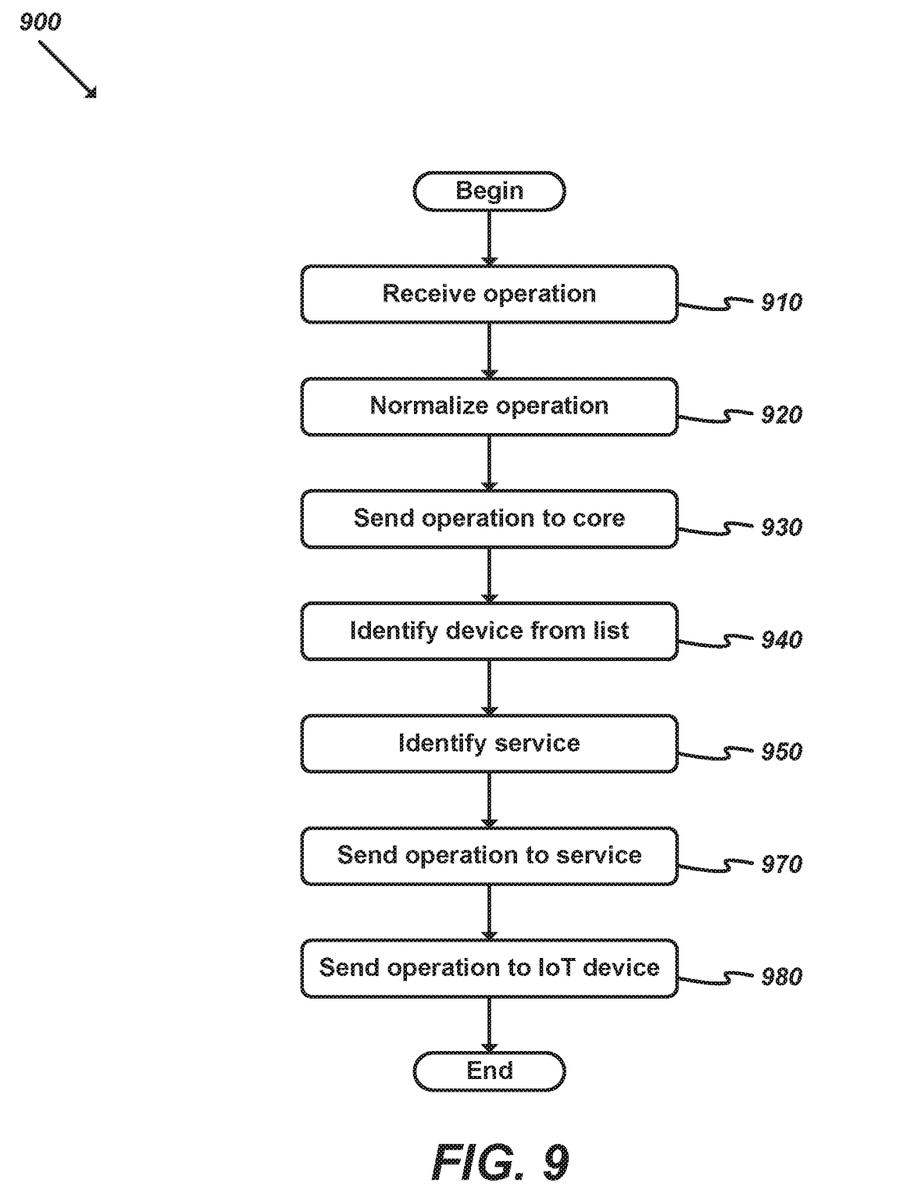
FIG. 9 illustrates a flow chart of an exemplary process that sends operations to an IoT device from a user device.

FIG. 9 illustrates a flow chart of an exemplary process 900 that sends operations to an IoT device from a user device. Such a process may begin, for instance, when a command is received at a user device application, when an IoT device responds to a command, etc. The process may be performed by a component such as translator 110. A similar complementary process may be used to receive messages from the IoT device and send messages to the user device.

As shown, the process may receive (at 910) an operation. Such an operation may be received from an app and be based on various user inputs or actions.

Next, the process may normalize (at 920) the operation for use within the internal protocol of the translator. The process may then send (at 930) the operation to the core. The process may then identify (at 940) a device from the device list and identify (at 950) the service associated with the device.

Process 900 may then send (at 970) the operation to the identified service. Finally, the process may send (at 980) the operation from the service to the IoT device and then may end.

One of ordinary skill in the art will recognize that processes 700-900 are exemplary and different embodiments may be implemented in different ways without departing from the scope of the disclosure. For instance, some embodiments may perform the operations in different orders, may omit various operations, and/or may include additional operations. As another example, some operations and/or sets of operations may be performed iteratively (e.g., as when relaying a series of commands from a user device to an IoT device). In addition, the processes may be divided into multiple sub-processes and/or combined with other processes or operations in a larger macro process. Furthermore, the processes may be executed by various different physical devices (and/or sets of devices).

III. Computer System

Many of the processes and modules described above may be implemented as software processes that are specified as one or more sets of instructions recorded on a non-transitory storage medium. When these instructions are executed by one or more computational element(s) (e.g., microprocessors, microcontrollers, digital signal processors (DSPs), application-specific integrated circuits (ASICs), field programmable gate arrays (FPGAs), etc.) the instructions cause the computational element(s) to perform actions specified in the instructions.

In some embodiments, various processes and modules described above may be implemented completely using electronic circuitry that may include various sets of devices or elements (e.g., sensors, logic gates, analog to digital converters, digital to analog converters, comparators, etc.). Such circuitry may be able to perform functions and/or features that may be associated with various software elements described throughout.

Figure 10:
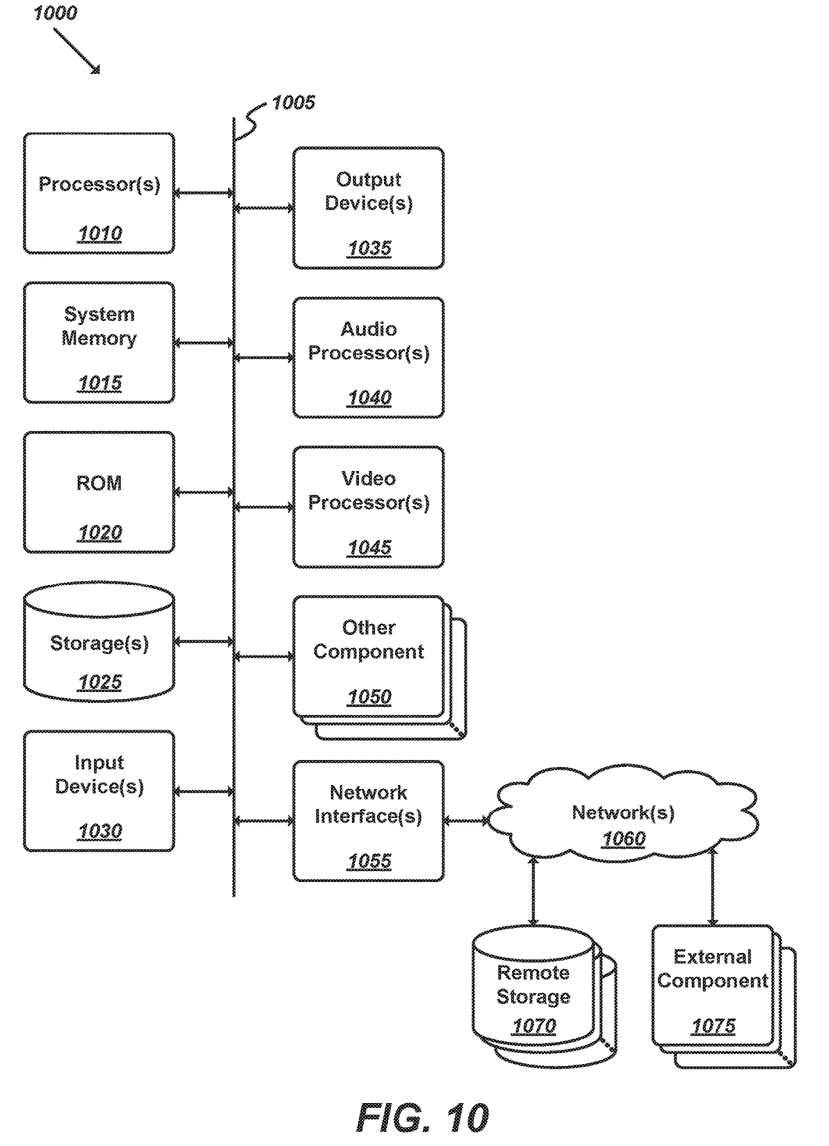
FIG. 10 illustrates a schematic block diagram of an exemplary computer system used to implement some embodiments.

FIG. 10 illustrates a schematic block diagram of an exemplary computer system 1000 used to implement some embodiments. For example, the system described above in reference to FIG. 1 may be at least partially implemented using computer system 1000. As another example, the communication structure described in reference to FIG. 6 and/or processes described in reference to FIGS. 7-9 may be at least partially implemented using sets of instructions that are executed using computer system 1000.

Computer system 1000 may be implemented using various appropriate devices. For instance, the computer system may be implemented using one or more personal computers (PCs), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 1000 may include at least one communication bus 1005, one or more processors 1010, a system memory 1015, a read-only memory (ROM) 1020, permanent storage devices 1025, input devices 1030, output devices 1035, audio processors 1040, video processors 1045, various other components 1050, and one or more network interfaces 1055.

Bus 1005 represents all communication pathways among the elements of computer system 1000. Such pathways may include wired, wireless, optical, and/or other appropriate communication pathways. For example, input devices 1030 and/or output devices 1035 may be coupled to the system 1000 using a wireless connection protocol or system.

The processor 1010 may, in order to execute the processes of some embodiments, retrieve instructions to execute and/or data to process from components such as system memory 1015, ROM 1020, and permanent storage device 1025. Such instructions and data may be passed over bus 1005.

System memory 1015 may be a volatile read-and-write memory, such as a random access memory (RAM). The system memory may store some of the instructions and data that the processor uses at runtime. The sets of instructions and/or data used to implement some embodiments may be stored in the system memory 1015, the permanent storage device 1025, and/or the read-only memory 1020. ROM 1020 may store static data and instructions that may be used by processor 1010 and/or other elements of the computer system.

Permanent storage device 1025 may be a read-and-write memory device. The permanent storage device may be a non-volatile memory unit that stores instructions and data even when computer system 1000 is off or unpowered. Computer system 1000 may use a removable storage device and/or a remote storage device as the permanent storage device.

Input devices 1030 may enable a user to communicate information to the computer system and/or manipulate various operations of the system. The input devices may include keyboards, cursor control devices, audio input devices and/or video input devices. Output devices 1035 may include printers, displays, audio devices, etc. Some or all of the input and/or output devices may be wirelessly or optically connected to the computer system 1000.

Audio processor 1040 may process and/or generate audio data and/or instructions. The audio processor may be able to receive audio data from an input device 1030 such as a microphone. The audio processor 1040 may be able to provide audio data to output devices 1040 such as a set of speakers. The audio data may include digital information and/or analog signals. The audio processor 1040 may be able to analyze and/or otherwise evaluate audio data (e.g., by determining qualities such as signal to noise ratio, dynamic range, etc.). In addition, the audio processor may perform various audio processing functions (e.g., equalization, compression, etc.).

The video processor 1045 (or graphics processing unit) may process and/or generate video data and/or instructions. The video processor may be able to receive video data from an input device 1030 such as a camera. The video processor 1045 may be able to provide video data to an output device 1040 such as a display. The video data may include digital information and/or analog signals. The video processor 1045 may be able to analyze and/or otherwise evaluate video data (e.g., by determining qualities such as resolution, frame rate, etc.). In addition, the video processor may perform various video processing functions (e.g., contrast adjustment or normalization, color adjustment, etc.). Furthermore, the video processor may be able to render graphic elements and/or video.

Other components 1050 may perform various other functions including providing storage, interfacing with external systems or components, etc.

Finally, as shown in FIG. 10, computer system 1000 may include one or more network interfaces 1055 that are able to connect to one or more networks 1060. For example, computer system 1000 may be coupled to a web server on the Internet such that a web browser executing on computer system 1000 may interact with the web server as a user interacts with an interface that operates in the web browser. Computer system 1000 may be able to access one or more remote storages 1070 and one or more external components 1075 through the network interface 1055 and network 1060. The network interface(s) 1055 may include one or more APIs that may allow the computer system 1000 to access remote systems and/or storages and also may allow remote systems and/or storages to access computer system 1000 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 1000 may be used in conjunction with some embodiments. More-over, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

The foregoing relates to illustrative details of exemplary embodiments and modifications may be made without departing from the scope of the disclosure as defined by the following claims.

We claim:

1. A system that provides communication among user devices and internet of things (IoT) devices, the system comprising:
at least one user device able to execute at least one application that is able to communicate using a first IoT protocol;
at least one IoT device able to communicate using a second IoT protocol; and
a universal translator device able to communicate using the first IoT protocol and the second IoT protocol across a wireless communication channel,
wherein:
a beacon signal is received at the universal translator device from the at least one IoT device across the wireless communication channel,
an existence message is generated at the universal translator device based on the beacon signal, and
the existence message is sent to the at least one user device from the universal translator across the wireless communication channel.

2. The system of claim 1, wherein the universal translator device comprises:
a core;
a set of services, each service in the set of services associated with a different IoT protocol; and
a set of virtual devices, each virtual device in the set of virtual devices associated with a different IoT protocol.

3. The system of claim 2, wherein each service in the set of services comprises a protocol specific element and a service porting layer.

4. The system of claim 2, wherein each virtual device in the set of virtual devices comprises a device specific element and a device porting layer.

5. The system of claim 4, wherein the core receives a command from the at least one user device via the protocol specific element and the service porting layer and delivers the command to the at least one IoT device via the device specific element and the device porting layer.

6. The system of claim 1, wherein a virtual device of the universal translator device is communicatively coupled between the at least one user device and the at least one IoT device if the first IoT protocol and second IoT protocol are different.

7. The system of claim 1, wherein the at least one user device is one of a smart phone, a tablet, a personal computer, and a remote control.

8. An automated method of providing communications between a user device and an Internet of things (IoT) device, the automated method comprising:
determining a protocol of the IoT device;
determining a protocol of the user device; and
inserting a virtual device between the IoT device and the user device if the protocol of the IoT device is different than the protocol of the user device, wherein the virtual device broadcasts a beacon to the user device.

9. The method of claim 8 further comprising:
providing a first protocol specific service that is associated with the protocol of the IoT device; and
providing a second protocol specific service that is associated with the protocol of the user device.

10. The method of claim 9 further comprising:
receiving an operation from the user device via the second protocol specific service; and
sending the operation to the IoT device via the first protocol specific service.

11. The method of claim 8, wherein determining a protocol of the IoT device comprises:
indentifying the IoT device; and
retrieving, from a device list, a protocol associated with the identified IoT device.

12. The method of claim 8, wherein determining a protocol of the user device comprises:
identifying an application running on the user device; and
retrieving, from an application list, a protocol associated with the identified application.

13. The method of claim 8, wherein the virtual device is associated with the protocol of the user device.

14. The method of claim 8 further comprising receiving a message from the IoT device via the first protocol specific service and sending the message to the user device via the second protocol specific service.

* * * * *